United States Patent
Rausch et al.

(10) Patent No.: US 7,155,732 B2
(45) Date of Patent: Dec. 26, 2006

(54) HEAT ASSISTED MAGNETIC RECORDING HEAD AND METHOD

(75) Inventors: Tim Rausch, Gibsonia, PA (US); Ibrahim Kursat Sendur, Pittsburgh, PA (US); William Albert Challener, Sewickley, PA (US); Christophe Daniel Mihalcea, Pittsburgh, PA (US); Keith Mountfield, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 539 days.

(21) Appl. No.: 10/655,994

(22) Filed: Sep. 5, 2003

(65) Prior Publication Data

US 2005/0052771 A1    Mar. 10, 2005

(51) Int. Cl.
G11B 11/14    (2006.01)

(52) U.S. Cl. ............... 720/659; 369/13.33; 369/13.23; 369/13.2

(58) Field of Classification Search ............. 369/13.33, 369/13.32, 13.24, 13.23, 13.22, 13.2, 13.17, 369/13.12, 13.02, 13.01; 720/659
See application file for complete search history.

(56) References Cited

U.S. PATENT DOCUMENTS

| | | | |
|---|---|---|---|
| 5,125,750 A | 6/1992 | Corle et al. ................. | 359/819 |
| 5,317,800 A | 6/1994 | Fedeli et al. ............. | 29/603.18 |
| 5,602,820 A | 2/1997 | Wickramasinghe et al. . | 369/126 |
| 5,930,434 A | 7/1999 | Mowry et al. ............... | 385/124 |
| 5,986,978 A | 11/1999 | Rottmayer et al. ....... | 369/13.17 |
| 6,016,290 A | 1/2000 | Chen et al. ............... | 369/13.17 |
| 6,043,940 A | 3/2000 | Kamiyama et al. ......... | 359/719 |
| 6,055,220 A | 4/2000 | Mamin et al. ............. | 369/13.13 |
| 6,275,453 B1 | 8/2001 | Ueyanagi et al. ........ | 369/44.14 |
| 6,298,026 B1 | 10/2001 | Suzuki et al. .......... | 369/112.24 |
| 6,404,706 B1 | 6/2002 | Stovall et al. ............. | 369/13.7 |
| 6,408,123 B1 | 6/2002 | Kuroda et al. .............. | 385/130 |
| 6,504,796 B1 | 1/2003 | Sakakima et al. ....... | 369/13.17 |
| 6,597,715 B1 | 7/2003 | Ueyanagi | |
| 6,873,576 B1 * | 3/2005 | Van Kesteren ........... | 369/13.17 |
| 2001/0006436 A1 | 7/2001 | Akiyama et al. ............. | 360/59 |
| 2001/0009541 A1 | 7/2001 | Ueyanagi ............... | 369/112.23 |
| 2001/0017820 A1 | 8/2001 | Akiyama et al. ........ | 369/13.01 |
| 2002/0003752 A1 | 1/2002 | Fuji et al. ................ | 369/13.13 |
| 2002/0056816 A1 | 5/2002 | Stark ...................... | 250/493.1 |

(Continued)

FOREIGN PATENT DOCUMENTS

EP        1128372 A2    8/2001

(Continued)

OTHER PUBLICATIONS

Rausch, T. et al, "Near Field Hybrid Recording with a Mode Index Waveguide Lens", Optical Data Storage 2000, Proc. SPIE v. 4090, p. 66-71.*

(Continued)

*Primary Examiner*—Julie Anne Watko
(74) *Attorney, Agent, or Firm*—Robert P. Lenart, Esq.; Pietragallo, Bosick & Gordon LLP

(57) ABSTRACT

A magnetic recording head comprises a write pole having a pole tip adjacent to an air bearing surface, a return pole, a near field transducer positioned adjacent to the air bearing surface for producing near field radiation for heating a portion of a magnetic storage medium, wherein a thermal profile of the portion of the magnetic storage medium has a maximum gradient at a location subject to a magnetic write field produced by the write pole. A disc drive that includes the magnetic recording head and a method of recording using the magnetic recording head are also provided.

20 Claims, 4 Drawing Sheets

U.S. PATENT DOCUMENTS

| | | | |
|---|---|---|---|
| 2002/0080709 A1 | 6/2002 | Park et al. | 369/118 |
| 2002/0114567 A1 | 8/2002 | Novotny et al. | 385/33 |
| 2002/0141118 A1 | 10/2002 | Nemoto | 360/319 |
| 2002/0167870 A1 | 11/2002 | Akiyama et al. | 369/13.33 |
| 2002/0192506 A1 | 12/2002 | Coffey et al. | 428/832.1 |
| 2003/0112542 A1 | 6/2003 | Rettner et al. | 360/59 |
| 2003/0123335 A1 | 7/2003 | Rettner et al. | 369/13.24 |
| 2003/0128452 A1* | 7/2003 | McDaniel et al. | 360/59 |
| 2004/0240327 A1* | 12/2004 | Sendur et al. | 369/13.35 |

FOREIGN PATENT DOCUMENTS

| | | | |
|---|---|---|---|
| EP | 1148370 A2 | 10/2001 | |
| WO | WO 01/97214 A2 | 12/2001 | |
| WO | WO 01/97214 A3 | 12/2001 | |
| WO | WO 03/060882 A1 | 7/2003 | |

OTHER PUBLICATIONS

Y. Martin et al., "Optical Data Storage Read Out at 256 Gbits/in$^2$," *Appl. Phys. Lett.*, vol. 71, No. 1, Jul. 7, 1997, pp. 1-3.

T. E. Schlesinger et al., "An Integrated Read/Write Head for Hybrid Recording," *Jpn. J. Appl. Phys.*, vol. 41, Part 1, No. 3B, Mar. 2002, pp. 1821-1824.

\* cited by examiner

HEAT ASSISTED MAGNETIC RECORDING HEAD AND METHOD

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

This invention relates to magnetic recording heads, and more particularly, to recording heads for heat assisted magnetic recording.

BACKGROUND OF THE INVENTION

In an effort to increase areal density of magnetic storage media, it is desirable to reduce the volume of magnetic material used to store bits of information in magnetic storage media. Superparamagnetic instabilities become an issue as the grain volume is reduced. The superparamagnetic effect is most evident when the grain volume V is sufficiently small that the inequality $K_u V/k_B T > 70$ can no longer be maintained. $K_u$ is the material's magnetic crystalline anisotropy energy density, $k_B$ is Boltzmann's constant, and T is the absolute temperature. When this inequality is not satisfied, thermal energy demagnetizes the stored bits. Therefore, as the grain size is decreased in order to increase the areal density, a threshold is reached for a given material $K_u$ and temperature T such that stable data storage is no longer feasible.

The thermal stability can be improved by employing a recording medium made of a material with a very high $K_u$. However, with the available materials current recording heads are not able to provide a sufficient or high enough magnetic writing field to write on such a medium. Accordingly, it has been proposed to overcome the recording head field limitations by employing thermal energy to heat a local area on the recording medium before or at about the time of applying the magnetic write field to the medium. By heating the medium, the $K_u$ or the coercivity is reduced such that the magnetic write field is sufficient to write to the medium. Once the medium cools to ambient temperature, the medium has a sufficiently high value of coercivity to assure thermal stability of the recorded information.

Heat assisted magnetic recording allows for the use of small grain media, which is desirable for recording at increased areal densities, with a larger magnetic anisotropy at room temperature to assure sufficient thermal stability. Heat assisted magnetic recording can be applied to any type of magnetic storage media, including tilted media, longitudinal media, perpendicular media and patterned media.

For heat assisted magnetic recording, an electromagnetic wave of, for example, visible, infrared or ultraviolet light can be directed onto a surface of a data storage medium to raise the temperature of the localized area of the medium to facilitate switching of the magnetization of the area. Well-known solid immersion lenses (SILs) have been proposed for use in reducing the size of a spot on the medium that is subjected to the electromagnetic radiation. In addition, solid immersion mirrors (SIMs) have been proposed to reduce the spot size. SILs and SIMs may be either three-dimensional or two-dimensional. In the latter case they correspond to mode index lenses or mirrors in planar waveguides. A metal pin can be inserted at the focus of a SIM to guide a confined beam of light out of the SIM to the surface of the recording medium. Commonly assigned copending U.S. patent application Ser. No. 10/391,729, filed Mar. 19, 2003, which is hereby incorporated by reference, discloses several waveguides having a metallic pin transducer for concentrating optical energy into a small spot.

For the design of an integrated heat assisted magnetic recording (HAMR) transducer, it has long been known that co-location of the near field optical source and the magnetic write field is required. Current designs for the integrated HAMR head rely on a perpendicular magnetic writer which requires a soft underlayer. Since HAMR requires a special media to enhance the coupling efficiency of the optical transducer and to control the thermal properties, it is highly desirable to remove the additional constraint of having a soft underlayer in the recording medium.

Thus there is a need for a HAMR head that can provide perpendicular magnetic writing to a storage medium that does not require a soft underlayer.

SUMMARY OF THE INVENTION

A magnetic recording head comprises a write pole having a pole tip adjacent to an air bearing surface, a return pole, a near field transducer positioned adjacent to the air bearing surface for producing near field radiation for heating a portion of a magnetic storage medium, and wherein a thermal profile of the portion of the magnetic storage medium has a maximum gradient at a location subject to a magnetic write field produced by the write pole. Various near field transducers can be used, including a metallic pin or a ridge waveguide.

If the near field transducer is a metallic pin, a waveguide can be used for coupling an electromagnetic wave to the near field transducer, wherein the metallic pin is positioned at a focal point of the waveguide. The magnetic recording head can further comprise means for electrically insulating the metallic pin from the write pole.

The invention also encompasses a disc drive comprising means for rotating a storage medium; and means for positioning a recording head adjacent to a surface of the storage medium; wherein the recording head includes a write pole having a pole tip adjacent to an air bearing surface, a return pole, a near field transducer positioned adjacent to the air bearing surface, for producing near field radiation for heating a portion of a magnetic storage medium, and wherein a thermal profile of the portion of the magnetic storage medium has a maximum gradient at a location subject to a magnetic write field produced by the write pole.

In another aspect, the invention provides a method of magnetic recording comprising: positioning an air bearing surface of a magnetic recording head adjacent to a magnetic storage medium, wherein the recording head includes a write pole having a pole tip adjacent to an air bearing surface, a return pole, a near field transducer positioned adjacent to the air bearing surface; using near field radiation produced at the near field transducer to heat a portion of the magnetic storage medium, wherein a thermal profile of the portion of the magnetic storage medium has a maximum gradient at a location subject to a magnetic write field produced by the write pole; and using a magnetic field produced by the write pole to affect the magnetization of the portion of the magnetic storage medium.

The thermal profile produced in the magnetic storage medium by the near field radiation can have a maximum gradient below an edge of the write pole.

DETAILED DESCRIPTION OF THE INVENTION

Figure 1:
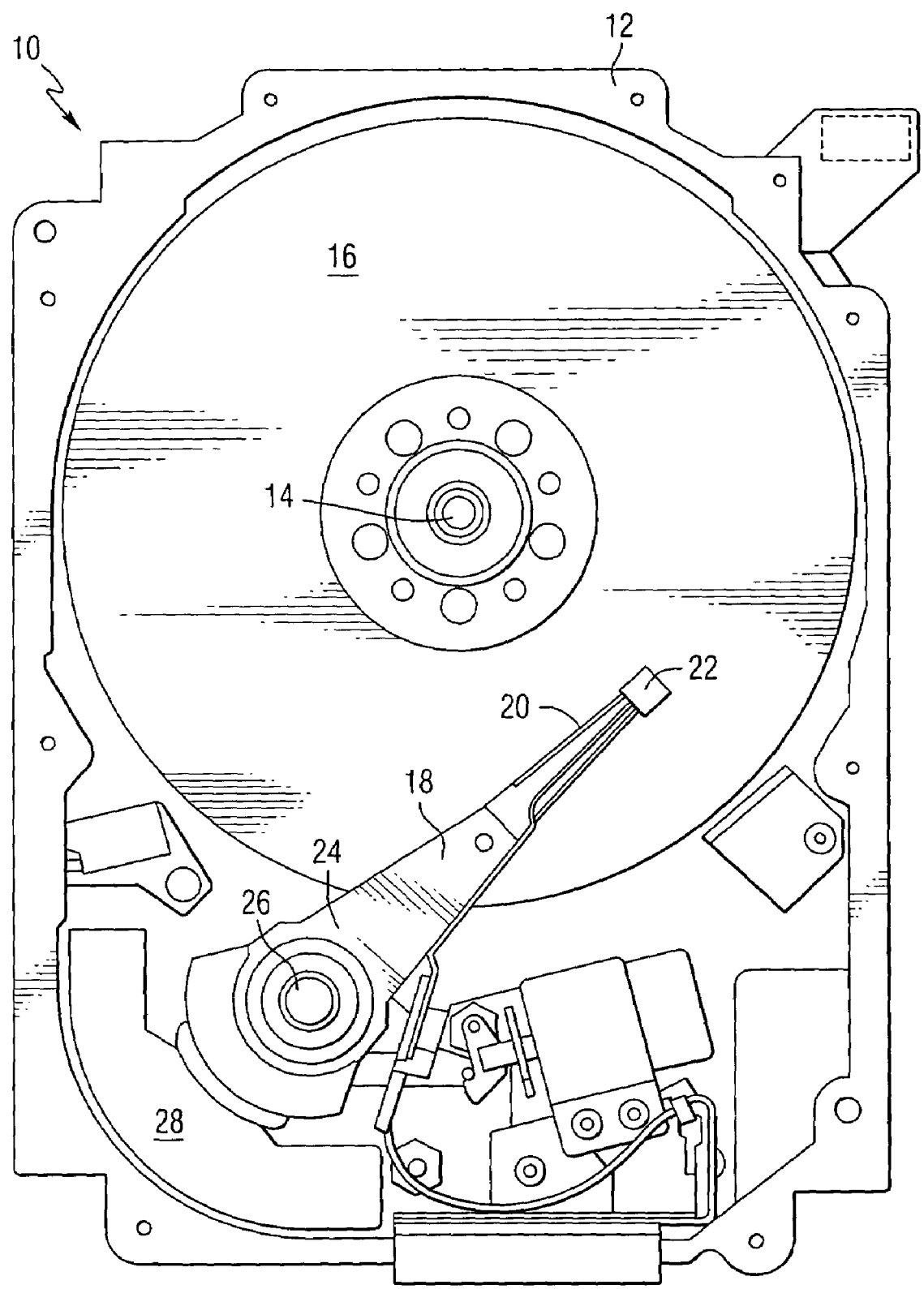
FIG. 1 is a pictorial representation of a magnetic disc drive that can include magnetic heads constructed in accordance with this invention.

Referring to the drawings, FIG. 1 is a pictorial representation of a disc drive 10 that can utilize magnetic recording heads constructed in accordance with this invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well-known in the art.

Figure 2:
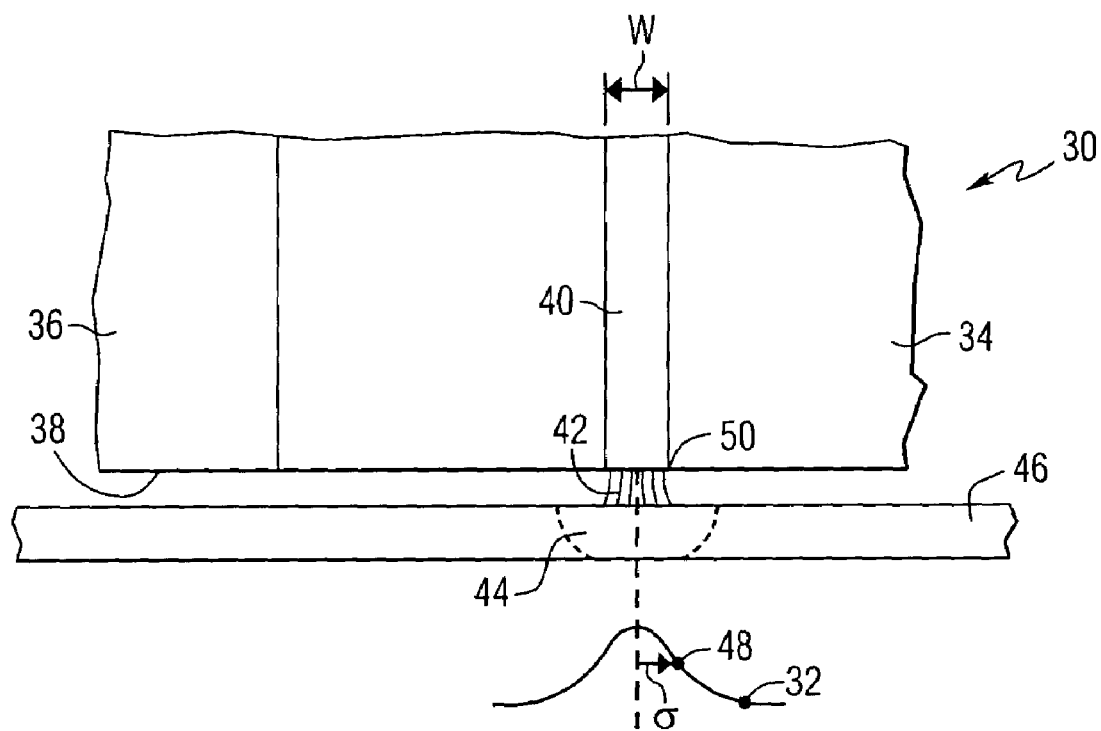
FIG. 2 is a schematic representation of a portion of a magnetic recording head with a graph of a thermal profile produced by the recording head.

FIG. 2 is a schematic representation of a portion of a ring type magnetic recording head 30 with a graph of a thermal profile 32 produced in a storage medium by the recording head. The recording head includes a write pole 34 and a return pole 36, each having an end positioned adjacent to an air bearing surface 38. A transducer in the form of a metallic pin 40 is positioned between the write pole and the return pole. The transducer is used to produce near field radiation illustrated by lines 42, that is used to heat a portion 44 of a magnetic storage medium 46. Curve 32 represents a thermal profile of the heated portion of the storage medium. In the example of FIG. 2, the pin is shown to have a width W, of for example 24 nm, and the peak temperature occurs under the center of the pin. Point 48 is located at the sharpest thermal gradient of the thermal profile and in this example is a distance σ of 16 nm from the center of the pin. The write pole corner 50 is located 12 nm from the center of the pin. While a metallic pin is shown in the example of FIG. 2 and in subsequent examples as the near field transducer, it should be understood that the invention is not limited to metallic pin transducers. For example, a ridge waveguide can also be used as the near field transducer.

Figure 3:
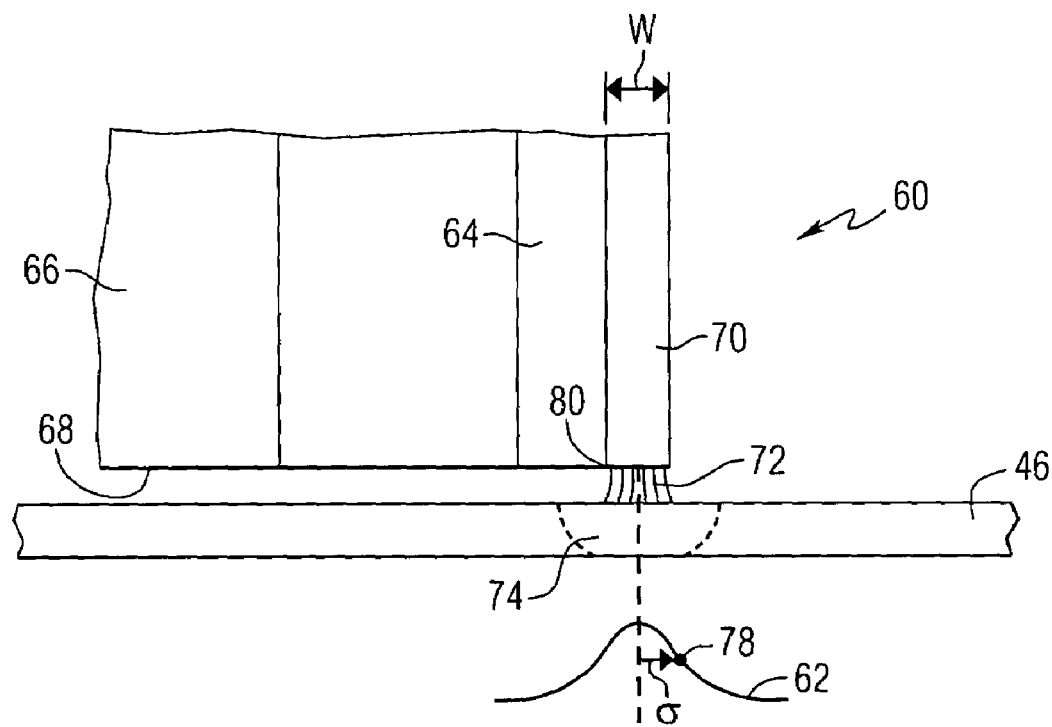
FIG. 3 is a schematic representation of a portion of a magnetic recording head with graphs of the magnetic field produced by the recording head and the coercivity of the storage medium.

FIG. 3 is a schematic representation of a portion of a perpendicular type magnetic recording head 60 with a graph of a thermal profile 62 produced by the recording head. The recording head includes a write pole 64 and a return pole 66, each having an end positioned adjacent to an air bearing surface 68. A transducer in the form of a metallic pin 70 is positioned adjacent to the write pole. The transducer is used to produce near field radiation illustrated by lines 72, that is used to heat a portion 74 of a magnetic storage medium 76. Curve 62 represents a thermal profile of the heated portion of the storage medium. In the example of FIG. 3, the pin is shown to have a width W, of for example 24 nm, and the peak temperature occurs under the center of the pin. Point 78 is located at the sharpest thermal gradient of the thermal profile and in this example is a distance σ of 16 nm from the center of the pin. The write pole corner 80 is located 12 nm from the center of the pin.

Modeling has shown that the spot size for the electromagnetic pin scales almost linearly with the diameter of the pin. In the examples of FIGS. 2 and 3, the thermal profile has a full width, half maximum (FWHM) of approximately 37 nm that can be produced by a pin having a diameter of 24 nm. The sharpest thermal gradient occurs at the first sigma of a Gaussian thermal profile. For a 24 nm pin with a 37 nm FWHM, the sharpest thermal gradients occur at about 16 nm to the left and right of the pin. This is shown schematically in FIG. 2, which shows a longitudinal ring head with the pin in the gap, and FIG. 3, which shows a perpendicular pole writer with the pin fabricated on top of the pole. For the perpendicular case the location of the sharpest thermal gradient occurs 28 nm (16 nm+12 nm) to the right of the pole. For the longitudinal ring head case the sharpest thermal gradient occurs 4 nm (16 nm−12 nm) to the right of the pole corner. While a Gaussian thermal profile has been assumed for these examples, other thermal profiles may be produced.

Figure 4:
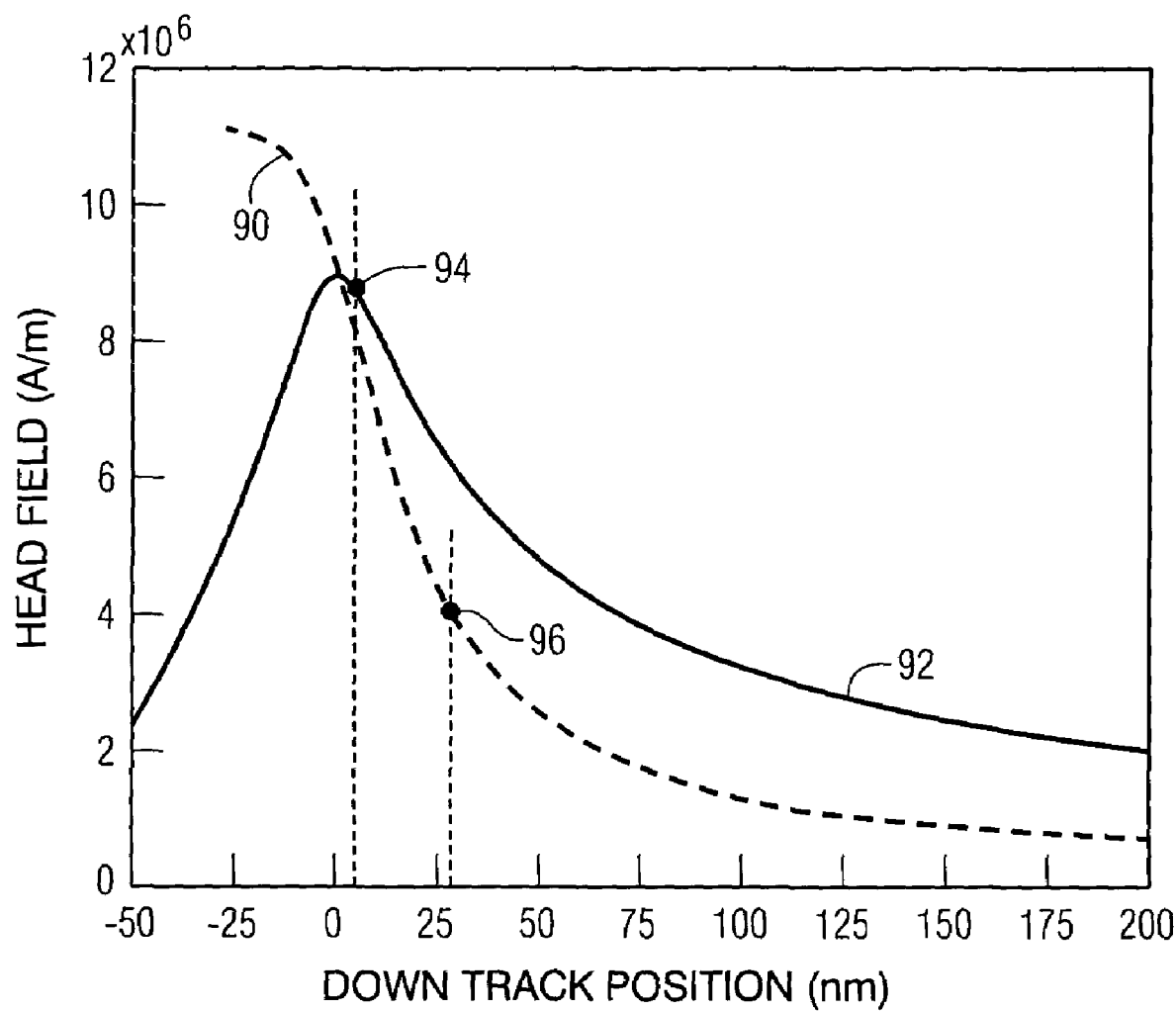
FIG. 4 is a graph showing head field versus down track position for perpendicular and longitudinal heads.

Assuming the medium has a perpendicular orientation, FIG. 4 shows the relative size of the magnetic fields from the heads of FIGS. 2 and 3. Curve 90 represents the perpendicular head field and curve 92 represents the longitudinal head field. In FIG. 4 the pole corners are placed at x=0 for both heads. Therefore with proper optimization of the system, the transition will occur at x=4 nm for the longitudinal ring head, as illustrated by point 94, and at x=28 nm for the perpendicular head, as illustrated by point 96. Note that the perpendicular component of the magnetic field of the ring head of FIG. 2 is used to obtain the data of FIG. 4. For the perpendicular head field a Westmijze head field was used, and for the longitudinal head field a Karlqvist head field was used. Assuming that the thermal gradients dominate and the head field gradients are irrelevant, it is apparent that by using the longitudinal ring head considerably more field can be obtained at the location of the transition of magnetization of the storage medium. In FIG. 4, the magnitude of the field is based on an example where the gap sizes are equal. The actual field will depend on the gap width of the magnetic heads, for example, increasing the gap lowers the field.

Figure 5:
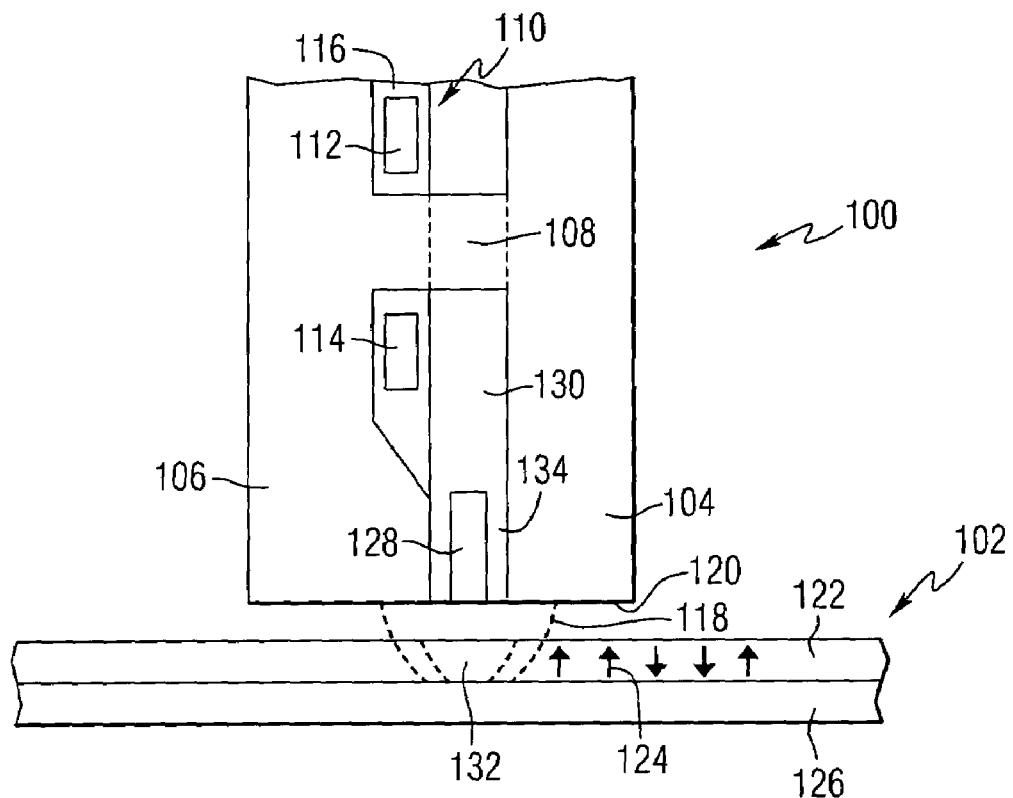
FIG. 5 is a cross-sectional view of a perpendicular magnetic recording head constructed in accordance with this invention, and a portion of an associated perpendicular magnetic storage medium.

FIG. 5 is a cross-sectional view of a portion of a magnetic recording head 100 constructed in accordance with this invention, and a portion of an associated perpendicular magnetic storage medium 102. The magnetic recording head 100 includes a write pole 104 and a return pole 106 coupled by a pedestal 108. A coil 110 comprising conductors 112 and 114 encircles the pedestal and is supported by an insulator 116. A current in the coil induces a magnetic field in the pedestal and the poles. Magnetic flux 118 exits the recording head at the air bearing surface 120 and is used to change the magnetization of portions of a magnetically hard layer 122 of the storage medium 102, as illustrated by arrows 124. An electric field transducer 128, in the form of a metallic pin, is positioned between the write pole and the return pole. The storage medium can include a substrate 126, but when a ring type recording head is used, the storage medium does not need to include a soft underlayer as found in other perpendicular recording media. The transducer is coupled to a waveguide 130 that receives an electromagnetic wave from an external source such as a laser. An electric field at the end of the transducer is used to heat a portion 132 of the storage medium to lower the storage medium coercivity so that the magnetic field from the write pole can affect the magnetization of the storage medium. The transducer is electrically isolated from the poles, for example by an insulating layer 134. The insulating layer can be formed by a portion of the waveguide or a separate layer, and can be made of, for example $Al_2O_3$. The composition and thickness of the insulating layer should be selected for optimum performance. The selected thickness will be a function of the pin shape and material composition, as well as the operational wavelength.

For a perpendicular recording head constructed in accordance with the invention, a storage medium having a soft underlayer may be used. In addition, in heat assisted magnetic recording media, a heat sink layer may be used to remove heat from the magnetic layer.

Figure 6:
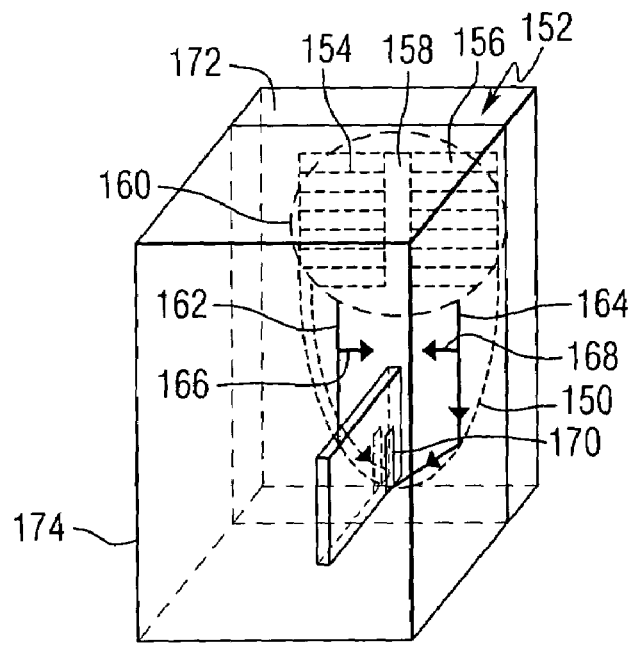
FIG. 6 is an isometric view of the perpendicular magnetic recording head of FIG. 5.

FIG. 6 is an isometric view of the perpendicular magnetic recording head of FIG. 5. The magnetic recording head 100 includes the components shown in FIG. 5 wherein the waveguide is a parabolic mirror 150 having a transducer embedded adjacent to an end near the air bearing surface of the recording head. The waveguide includes a dual input grating coupler 152 that is comprised of gratings 154 and 156 separated by a gap 158. A laser beam illustrated by dotted circle 160 is directed onto the gratings and coupled to the waveguide by the gratings to produce electromagnetic waves within the waveguide as illustrated by arrows 162 and 164. The gratings are configured such that the wave illustrated by arrow 164 is phase shifted by 180° with respect to the wave illustrated by arrow 162. Arrows 166 and 168 illustrate the instantaneous electric field of the waves. The waves are reflected off of the parabolic sides of the waveguide and the electric field components of the reflected waves add in the vertical direction at the transducer so that the transducer 170 concentrates the electromagnetic waves near the air bearing surface of the recording head to heat a portion of the magnetic storage medium. The waveguide is shown to be embedded in a cladding layer 172 and mounted on a slider 174.

The recording heads of this invention can incorporate various waveguides such as those illustrated in U.S. patent application Ser. No. 10/391,729, to generate focused beams by means of mode index lenses or planar solid immersion mirrors. The waveguide in the recording head of FIG. 6 is a two-dimensional waveguide in the form of a solid immersion mirror, including a metal pin embedded in an end of the waveguide. The tip of the pin can extend beyond the waveguide. The waveguide includes edges in this example having a substantially parabolic shape. While FIG. 6 shows a specific example, it should be understood that other waveguides that utilize other type of polarization can also be used.

Due to differences in refractive index between the waveguide and the adjacent material, an electromagnetic wave traveling in the axial direction through the waveguide would be reflected by the waveguide onto the surface of the metal pin. If the electric field at the focal point is parallel to the axis of the pin, then it can couple to the pin and generate surface plasmons along the surface of the pin. Near field radiation then emanates from the tip of the pin. The metal pin placed at the focus concentrates the light to a much smaller spot than would be possible with a mode index lens or SIM alone. The waveguide can be truncated at the end adjacent to the pin so that most of the incoming electromagnetic wave strikes the edges of the waveguide at an angle less than some predetermined angle, such as 45°. For a linearly polarized collimated electromagnetic wave, edges having a parabolic shape will focus the wave to a focal point. However, it should be understood that other edge shapes can be used if the incoming wave is conditioned such that the combination of the wave characteristics and the edge shape result in the desired focusing of the wave at the pin. The pin can have a rectangular cross-section and can be tapered to a point. However, pins having other cross-sectional shapes can also be used.

As discussed in U.S. patent application Ser. No. 10/391, 729, the waveguide can be made of, for example, a high index dielectric core material like $TiO_2$, $Ta_2O_5$, Si, SiN, or ZnS depending on the wavelength and refractive index desired. For example, Si has a very large index of 3.5 at a wavelength of 1550 nm in the near infrared, but it is not transparent to visible light. $Ta_2O_5$ has a lower index of about 2.1, but is transparent throughout the near infrared and visible. The waveguide also contains dielectric cladding layers on either side of the core. The cladding layer must have a lower refractive index than the core layer. Preferably the difference in refractive index between the core and cladding should be as large as possible. Air is a suitable dielectric for one side of the cladding. Other dielectrics that could be used as cladding layers include $SiO_2$ with an index of 1.5 and $Al_2O_3$ with an index of about 1.8.

When the invention is used with either a transverse electric (TE) or transverse magnetic (TM) mode electromagnetic wave, means can be provided to phase shift a portion of the electromagnetic wave. This phase shift can be achieved by providing a means for launching the two-dimensional analog of a radially polarized wave into the planar waveguide. This is called a split linear polarization waveguide mode. Two methods are described in U.S. patent application Ser. No. 10/391,729, for achieving the split linear polarization. The first technique modifies half of the planar waveguide by changing the refractive index of the core or cladding dielectrics and/or the thickness of the core or cladding dielectrics in the waveguide in one section. An alternative technique for generating a radially polarized planar waveguide mode makes use of a diffraction grating to launch the planar mode. Diffraction gratings are commonly used to inject light into a planar waveguide. To generate radial polarization the two diffraction gratings are used with a longitudinal offset between them. The purpose of the dual grating is to introduce a relative 180° phase shift between the two halves of the beam.

In the center of the SIM is a "dead spot" where no light is launched into the waveguide. The ring head is fabricated within this gap so a split back head is not required (although the design will work with one). The functionality of the pin and the waveguide is identical to what has been described in U.S. patent application Ser. No. 10/391,729. However, this invention uses the perpendicular field components from a ring head. It is important to point out that there are a number of variations on the pin design. For example it has been shown that surrounding the pin in a dielectric or having the pin protrude out from the SIM enhances the effects. All of these additional modifications are compatible with this design. It should be noted that this invention is not limited to perpendicular writers or writers in disc drives. For example, in principle the advantages of heat assisted magnetic recording can be used to extend the areal densities of longitudinal and tilted media recording schemes where the anisotropy of the medium may not be perpendicular to the plane of the film. In these instances, the in-plane field component of the magnetic head field would be used instead of the perpendicular component to orient the medium after it has been heated to reduce the coercivity. Specifically for longitudinal media the in-plane field component is largest directly beneath the center of the gap. In this instance, it would be beneficial to have the pin positioned so that the sharpest thermal gradient occurs at this location.

There are a number of advantages to using a ring head. The most important is the elimination of the need for a soft underlayer in the medium, thereby simplifying the medium development process. This simplifies the design of a medium that meets the strict HAMR requirements such as optimizing the coupling from the near field transducer and controlling the thermal properties within the medium. In addition, by not using a soft underlayer, the soft underlayer noise is eliminated.

To get the sharpest possible transition it is desirable to maximize the field gradient with the thermal gradient, regardless of whether or not the medium is granular or continuous. This places some constraints on the location of the pole relative to the near field transducer. The demagnetization field will always oppose the head field and hence acts to broaden the transition. The thermal gradients aid in the transition formation effectively giving a sharper transition.

Since the medium is spinning, the peak of the thermal profile may not line up with the peak of the incident optical beam. This is known as preheating and is well understood in optical recording. In addition, since the near field transducer will be close to the write pole, the pole may distort the electromagnetic field profile in the transducer leading to a change in the incident optical profile. However, for the purposes of this description, it is assumed that the thermal profile is centered immediately below the transducer and that the distortion of the optical spin due to the pole is minimal.

In addition to the recording heads and disc drive described above, this invention also provides a method of magnetic recording comprising: positioning an air bearing surface of a magnetic recording head adjacent to a magnetic storage medium, wherein the recording head includes a write pole having a pole tip adjacent to an air bearing surface, a return pole, a near field transducer positioned adjacent to the air bearing surface, and means for coupling an electromagnetic wave to the near field transducer; using near field radiation produced at the metallic pin to heat a portion of the magnetic storage medium between the write pole and the return pole; and using a magnetic field produced by the write pole to affect the magnetization of the portion of the magnetic storage medium. The thermal profile produced in the magnetic storage medium by the near field radiation can have a maximum gradient below an edge of the write pole.

While the present invention has been described in terms of several examples, it will be apparent to those skilled in the art that various changes can be made to the disclosed examples without departing from the scope of the invention as defined by the following claims.

What is claimed is:

1. A magnetic recording head comprising:
   a write pole having a pole tip adjacent to an air bearing surface;
   a return pole;
   a near field transducer positioned adjacent to the air bearing surface for producing near field radiation for heating a portion of a magnetic storage medium; and
   wherein a thermal profile of the portion of the magnetic storage medium has a maximum gradient at a location subject to a magnetic write field produced by the write pole.

2. The magnetic recording head of claim 1, wherein the near field transducer comprises one of: a metallic pin and a ridge waveguide.

3. The magnetic recording head of claim 1, further comprising a waveguide for coupling an electromagnetic wave to the near field transducer; and
   wherein the near field transducer comprises a metallic pin positioned at a focal point of the waveguide.

4. The magnetic recording head of claim 3, further comprising means for coupling an electromagnetic wave to the waveguide.

5. The magnetic recording head of claim 4, wherein the means for coupling an electromagnetic wave to the waveguide comprises first and second gratings.

6. The magnetic recording head of claim 1, wherein the near field transducer comprises a metallic pin, and the magnetic recording head further comprises means for electrically insulating the metallic pin from the write pole.

7. The magnetic recording head of claim 6, wherein the means for electrically insulating the metallic pin from the write pole comprises a layer of insulation between the pin and the write pole.

8. The magnetic recording head of claim 1, wherein the thermal profile produced in a magnetic storage medium by the near field radiation has a maximum gradient below an edge of the write pole.

9. The magnetic recording head of claim 1, wherein the heated portion of the magnetic storage medium is between the write pole and the return pole.

10. A disc drive comprising:
    a motor for rotating a storage medium; and
    an arm for positioning a recording head adjacent to a surface of the storage medium;
    wherein the recording head includes a write pole having a pole tip adjacent to an air bearing surface, a return pole, a near field transducer positioned adjacent to the air bearing surface for producing near field radiation for heating a portion of a magnetic storage medium, wherein a thermal profile of the portion of the magnetic storage medium has a maximum gradient at a location subject to a magnetic write field produced by the write pole.

11. The disc drive of claim 10, wherein the near field transducer comprises one of: a metallic pin and a ridge waveguide.

12. The disc drive of claim 10, further comprising a waveguide for coupling an electromagnetic wave to the near field transducer; and
    wherein the near field transducer comprises a metallic pin positioned at a focal point of the waveguide.

13. The disc drive of claim 12, further comprising means for coupling an electromagnetic wave to the waveguide.

14. The disc drive of claim 13, wherein the means for coupling an electromagnetic wave to the waveguide comprises first and second gratings.

15. The disc drive of claim 10, wherein the near field transducer comprises a metallic pin, and the disc drive further comprises means for electrically insulating the metallic pin from the write pole.

16. The disc drive of claim 15, wherein the means for electrically insulating the metallic pin from the write pole comprises a layer of insulation between the pin and the write pole.

17. The disc drive of claim 10, wherein the thermal profile produced in a magnetic storage medium by the near field radiation has a maximum gradient below an edge of the write pole.

18. The disc drive of claim 10, wherein the heated portion of the magnetic storage medium is between the write pole and the return pole.

19. A method of magnetic recording comprising:
positioning an air bearing surface of a magnetic recording head adjacent to a magnetic storage medium, wherein the recording head includes a write pole having a pole tip adjacent to an air bearing surface, a return pole, a near field transducer positioned adjacent to the air bearing surface;
using near field radiation produced at the near field transducer to heat a portion of the magnetic storage medium, wherein a thermal profile of the portion of the magnetic storage medium has a maximum gradient at a location subject to a magnetic write field produced by the write pole; and
using the write field produced by the write pole to affect the magnetization of the portion of the magnetic storage medium.

20. The method of claim 19, wherein the thermal profile of the portion of the magnetic storage medium has a maximum gradient below an edge of the write pole.

* * * * *